US 6,477,453 B2

(12) United States Patent
Oi et al.

(10) Patent No.: US 6,477,453 B2
(45) Date of Patent: Nov. 5, 2002

(54) CONTROLLER FOR VEHICLE WITH SELF-DIAGNOSTIC FUNCTION AND RECORDING MEDIUM

(75) Inventors: Masaya Oi, Okazaki; Yoshiyuki Maki, Kariya, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/024,559

(22) Filed: Dec. 21, 2001

(65) Prior Publication Data
US 2002/0087237 A1 Jul. 4, 2002

(30) Foreign Application Priority Data
Dec. 28, 2000 (JP) ........................................ 2000-402415

(51) Int. Cl.$^7$ ............................................ G01M 17/00
(52) U.S. Cl. ............................ 701/31; 701/29; 701/32; 701/33; 701/34
(58) Field of Search ............................. 701/31, 33, 34, 701/35, 36, 29; 340/438

(56) References Cited

U.S. PATENT DOCUMENTS

| | | | | |
|---|---|---|---|---|
| 5,214,582 A | * | 5/1993 | Gray ............................ | 701/33 |
| 5,220,668 A | * | 6/1993 | Bullis .......................... | 709/102 |
| 5,631,831 A | | 5/1997 | Bird et al. .................... | 701/29 |
| 5,671,141 A | | 9/1997 | Smith et al. .................. | 701/29 |

FOREIGN PATENT DOCUMENTS

| | | |
|---|---|---|
| EP | 0987423 A2 | 3/2000 |
| JP | A-8-95788 | 4/1996 |
| JP | A-62-291537 | 12/1997 |

OTHER PUBLICATIONS

U S. Pattent Application Ser. No. 09/840,877.

* cited by examiner

Primary Examiner—William A. Cuchlinski, Jr.
Assistant Examiner—Marthe Y. Marc-Coleman
(74) Attorney, Agent, or Firm—Nixon & Vanderhye P.C.

(57) ABSTRACT

To enable easier change of a self-diagnostic program for making a contribution towards improvement in quality of the same program, even if it is required to correct an execution condition for fault detection due to the change of a diagnosis object, a diagnostic drive determination object is provided to determine the execution condition of a fault detection object driven from a diagnostic scheduler object. The diagnostic scheduler object determines the fault detection object of the drive object and requests the drive acknowledgment to the diagnostic drive determination object. Upon issuance of the drive acknowledgment request, the diagnostic drive determination object obtains the information required for the execution condition determination and notifies a drive acknowledgment/non-acknowledgment message. Only when the acknowledgment message is notified, does the diagnostic scheduler object issue a drive instruction to the fault detection object of the diagnostic object.

25 Claims, 8 Drawing Sheets

CORRESPONDENCE TABLE

| DRIVE TRIGGER | FAULT DETECTION OBJECT | FAULT DETECTION OBJECT | ...... | FAULT DETECTION OBJECT |
|---|---|---|---|---|
| 32ms | ...... | — | ...... | — |
| 64ms | WATER TEMPERATURE SENSOR DIAGNOSIS | AIR FLOW SENSOR DIAGNOSIS | ...... | INTAKE AIR TEMPERATURE SENSOR DIAGNOSIS |
| 128ms | THROTTLE SENSOR DIAGNOSIS | — | ...... | — |
| ...... | ...... | ...... | ...... | ...... |

FIG. 8A

RELATION TABLE

| DETERMINATION ITEMS \ OTHER ITEMS | WATER TEMPERATURE SENSOR DIAGNOSIS | INTAKE AIR TEMPERATURE SENSOR DIAGNOSIS | THROTTLE SENSOR DIAGNOSIS | AIR FLOW SENSOR DIAGNOSIS |
|---|---|---|---|---|
| WATER TEMPERATURE SENSOR DIAGNOSIS | | — | — | — |
| INTAKE AIR TEMPERATURE SENSOR DIAGNOSIS | — | | AFTER EXECUTION | — |
| THROTTLE SENSOR DIAGNOSIS | NORMAL CONDITION | — | | — |
| AIR FLOW SENSOR DIAGNOSIS | — | NORMAL CONDITION | AFTER EXECUTION | |

FIG. 8B

CONDITION TABLE

| OBJECT ITEMS \ CONDITION ITEMS | TIME AFTER IGNITION | BATTERY VOLTAGE |
|---|---|---|
| WATER TEMPERATURE SENSOR DIAGNOSIS | 0s | 10V |
| INTAKE AIR TEMPERATURE SENSOR DIAGNOSIS | 10s | 10V |
| THROTTLE SENSOR DIAGNOSIS | 5s | 10V |
| AIR FLOW SENSOR DIAGNOSIS | 10s | 12V |

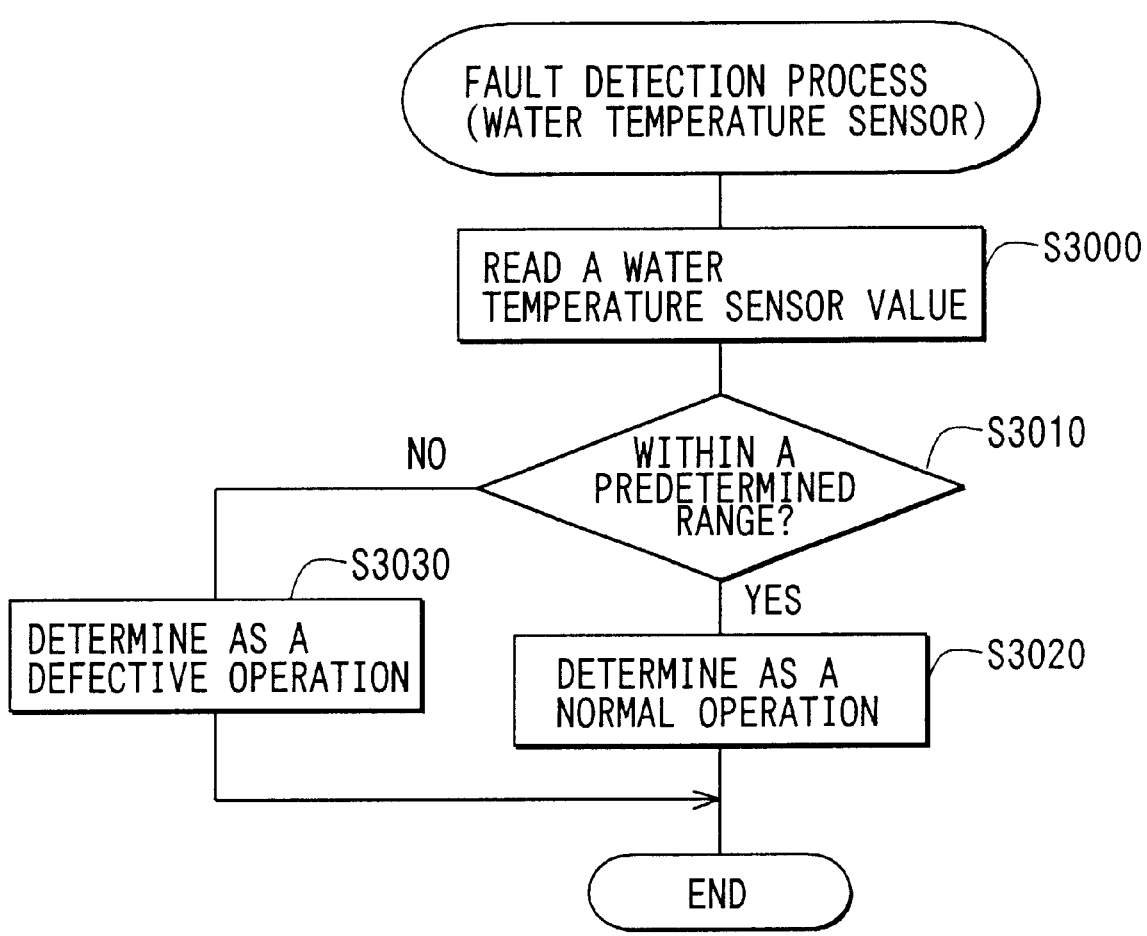

CONTROLLER FOR VEHICLE WITH SELF-DIAGNOSTIC FUNCTION AND RECORDING MEDIUM

CROSS REFERENCE TO RELATED APPLICATION

This application is based on and incorporates herein by reference Japanese Patent Application No. 2000-402415 filed on Dec. 28, 2000.

BACKGROUND OF THE INVENTION

1. Field of the Invention

The present invention relates to a programming technique for a self-diagnostic function in a controller for controlling a vehicle.

2. Description of Related Art

In general, the rapid progress of computer techniques in recent years has brought about the introduction of computer systems in every aspect of a vehicle, such as an automobile.

Particularly, a computer system for controlling a vehicle to assure higher reliability has been improved by including a self-diagnostic or self-diagnosis function. It is now possible for a vehicle to execute a diagnostic process for automatically checking operating conditions of a computer unit and its sensors or the like. This is done in an adequate time period by lighting a warning lamp (MIL), when a fault occurs therein. This notifies the occurrence of the fault to the user and/or stores the fault code (DTC), which allows a maintenance person to identify the nature of the fault. This diagnostic process aides about 200 items currently covering the sensors, such as: a crank angle sensor, a cam angle sensor, a water temperature sensor, or the like. The object of this diagnostic process is called the "diagnosis object" or "diagnostic object."

In the design stage of the self-diagnostic program, to realize this diagnostic process, it must be realized that the diagnostic object is changed depending on car models, a grade of a car, and/or timing of model changes. Therefore, the fault detection logic is generally described for each diagnostic object in the self-diagnostic program. Therefore, if the diagnostic object is changed, depending upon the change, the change may be covered by changing only the corresponding fault detection logic.

Programming focused on a "thing" such as a diagnostic object is well known as "object-oriented programming." A change in units of an object can be realized for a change of the diagnostic object. The object which does not require any change can be reused by structuring the object in units of fault detection logic.

In this specification, the expression an/the "object executes . . . " in which the term "object" is the subject of a sentence is often used but it means that an operation of the object is executed when a CPU provided in the vehicle controller executes the program installed in the object.

The fault detection logic explained above is usually repeatedly executed by predetermined timing, in which timing a plurality of fault detection logics should be executed. This has been described in a platform (hereinafter, referred to as "PF") as a program of a lower hierarchy.

Meanwhile, when the diagnostic object is changed, the execution timing of the fault detection logic may also be changed in some cases. Therefore, a program structure which provides an independent scheduler program (scheduler) for discriminating the execution timing from the PF has also been proposed. Therefore, there is merit that the change in execution timing can be covered easily by changing the scheduler.

However, for execution of a part of the fault detection logic, the timing and predetermined conditions must be considered. Namely, even when the execution timing is discriminated, situations exist in which executions should not occur. This is because of the condition that the fault detection logics are related to each other.

In some cases, the corresponding fault detection logic and a relationship with the correction of the fault detection logic are required for a change in the diagnostic object or the change in the execution timing. This correction will be explained below.

For example, when the first sensor is deemed defective, a fault of a second sensor in relation to the first sensor cannot be determined in some cases. In particular, an air-flow sensor for measuring the amount of intake air in the engine can be diagnosed accurately only when the intake air temperature sensor for detecting the intake air temperature is diagnosed as normal.

Moreover, a detected value of the first sensor is used for a diagnostic process of the second sensor in some cases. In particular, for the diagnostic process of the intake air temperature sensor explained above, or for detection value of a throttle sensor for detecting an opening of a throttle valve that is driven by an accelerator pedal.

As explained above, an execution condition for insuring the fault diagnosis result of the diagnostic object exists in some cases, and this execution condition is determined by the fault detection logic. The determination logic of the execution condition depends on other fault detection logic.

In this program structure, when fault detection logic corresponding to a certain diagnostic object is changed, it has been requested to review all fault detection logic relating to the above fault detection logic. In the example explained above, if fault detection logic of a throttle sensor is changed, the fault detection logic of the intake air temperature sensor and the fault detection logic of the air-flow sensor in relation to the intake air temperature sensor, have to be changed as required or as necessary.

Therefore, an extraordinary long time has been required in some cases to change the self-diagnostic program and it has lowered the re-utilization property. Moreover, if the change becomes large in scale, a possibility for generating a discrepancy in the program also becomes large and therefore the quality of the self-diagnostic program may be lowered.

The present invention has been proposed to overcome the problems explained above. It is therefore an object of the present invention to provide the controller for a vehicle having the self-diagnostic function with the ability to execute the fault detection of the diagnostic object with appropriate timing. Another objective is to assure change of the self-diagnostic program to realize the self-diagnostic function which contributes to quality improvement of the self-diagnostic program. This is so even if it is required to correct the execution condition of the fault detection due to a change in the diagnostic object.

SUMMARY OF THE INVENTION

In order to achieve objects of the invention, a controller for a vehicle is provided with the self-diagnostic function for automatically detecting a fault of the diagnostic object.

The fact that the self-diagnostic program is to realize this self-diagnostic function is based on the precondition that the fault detection logic, to detect a fault of the diagnostic object, is described through division thereof in a unit related to the diagnostic object. The unit of the diagnostic object is determined for each diagnostic object or for each fault detection process. The diagnostic object corresponds to the fault detection process almost on a one to one basis, but the diagnostic object of a common fault detection process can also exist. Therefore, it is preferable to provide the detection logic for every fault detection process from a point of view of providing a compact self-diagnostic program.

Under the pre-condition explained above, the determination logic of the execution condition when executing the fault detection logic based on an external timing signal is described simultaneously, but separately from the fault detection logic. For example, the determination logic of the execution condition is described as an exclusive program.

The self-diagnostic program is an object-oriented design and is structured in units of objects allowing reuse with inclusion of the fault detection object for detecting; a fault of the diagnostic object, a scheduler object, and a drive determination object. The fault detection object is prepared for every unit in relation to the diagnostic object.

In this case, the scheduler object determines the fault detection object as a drive object based on the external timing signal. Therefore, the drive determination object determines whether the fault detection object, as a drive object, determined by the scheduler object, should be driven or not. It also provides drive permission to the scheduler object based on the result of determination.

When this drive permission is issued, the scheduler object sends a drive instruction to the fault detection object. Namely, the determination object of the execution condition is executed by the drive determination object separate from the fault detection object. Therefore, if it is required to correct the execution condition due to the change of the diagnostic object, this requirement can be covered by adding a change to the corresponding fault detection object and drive determination object. It is no longer required to correct a fault detection object that is not directly related to the changed diagnostic object. As a result, the self-diagnostic program can be changed easily. Moreover, since the changes are summarized, a human mistake can be reduced, thereby providing contribution to improvement in the quality of the self-diagnostic program.

The drive determination object is thought to determine whether the fault detection object of the drive object should be driven or not, in consideration of the relation with the fault detection among the fault detection objects. The relationship with fault detection as explained here, is considered, for example, as a case where a fault of the second sensor in relation to the first sensor cannot be determined accurately. This occurs when the first sensor is determined as defective as explained above, and a detected value of the first sensor is used for the diagnostic process of the second sensor. More particularly, the determination in consideration of the relationship with the fault detection is thought to be made depending on at least one of the fault detection results or a fault detection execution record of the other fault detection object in relation to the fault detection object as a drive object.

Since electric power is usually supplied to sensors or the like from an on-board battery, if the battery is temporarily. removed, generation of fault is determined, even if the sensor itself does not generate a fault, because the detected value obtained from a sensor is no longer within a normal range. Therefore, when battery voltage is not in a predetermined range, the diagnostic process is generally stopped or the result of diagnosis is invalidated after the diagnostic process. Therefore, it is important that the battery voltage is normal for several fault detection processes.

Continuing, the drive determination object may determine whether the fault detection object of the drive object should be driven or not in consideration of the pre-condition of the fault detection. Here, it is enough of a pre-condition that the condition is used in common at least among a part of the fault detection objects. In particular, determination of the pre-condition is thought to be made based on at least one of the voltages of the on-board battery and an elapsed time after starting the engine of the vehicle. When there is a sensor in which a detected value is not in the normal range immediately after starting the engine, a determination is made based on the passage of time after starting the engine.

Accordingly, the pre-condition for execution of the diagnostic function is summarized for the description and it can change easily. Moreover, when thinking that the pre-condition is used in common for a plurality of the fault detection logics, this pre-condition contributes to improvement in the quality of the self-diagnostic program in such a manner that the self-diagnostic program can be compactly designed.

The scheduler object determines the fault detection object of the drive object based on the external timing signal. Therefore, when the execution timing is changed, it can be covered by changing the scheduler object. Namely, in the present invention, the execution timing and execution condition are different and these are individually determined. Accordingly, the scheduler object and drive determination object are provided separately.

In order to facilitate a change of the scheduler object, it is preferable that the scheduler object have a correspondence table describing the fault detection object of the drive object which corresponds to the external timing signal. The fault detection object as a drive object is determined by referring to the correspondence table. In some cases, a plurality of fault detections are conducted in a certain timing, for example, in a manner that a water temperature sensor diagnosis, an air-flow sensor diagnosis and an intake air temperature sensor diagnosis are executed, every sixty-four (64) ms. Therefore, when a relationship between the timing signal and fault detection object as a drive object is summarized in a table, the relationship is easily understood. The execution timing is easily changed and much contribution is made, resulting in improvement of the quality of the self-diagnostic program.

Here, the self-diagnostic program installed in the controller for a vehicle explained above is recorded, for example, in a computer-readable recording medium such as an FD, an MO, a DVD, a CD-ROM, a hard disc, or the like. It can be driven as required by loading it into the computer system. Moreover, it is also possible to pre-record the program into a ROM and a backup RAM as a computer-readable recording medium, and then load the ROM or backup RAM into the computer system for use.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention, together with additional objectives, features and advantages thereof, will be best understood from the following description, the appended claims and the accompanying drawings in which:

FIG. 8A is a relation table for determining setup of the execution condition;

FIG. 8B is a condition table for determining setup of the execution condition; and FIG. 9 is a flowchart of a fault detection process.

DETAILED DESCRIPTION OF PREFERRED EMBODIMENT

Figure 1:
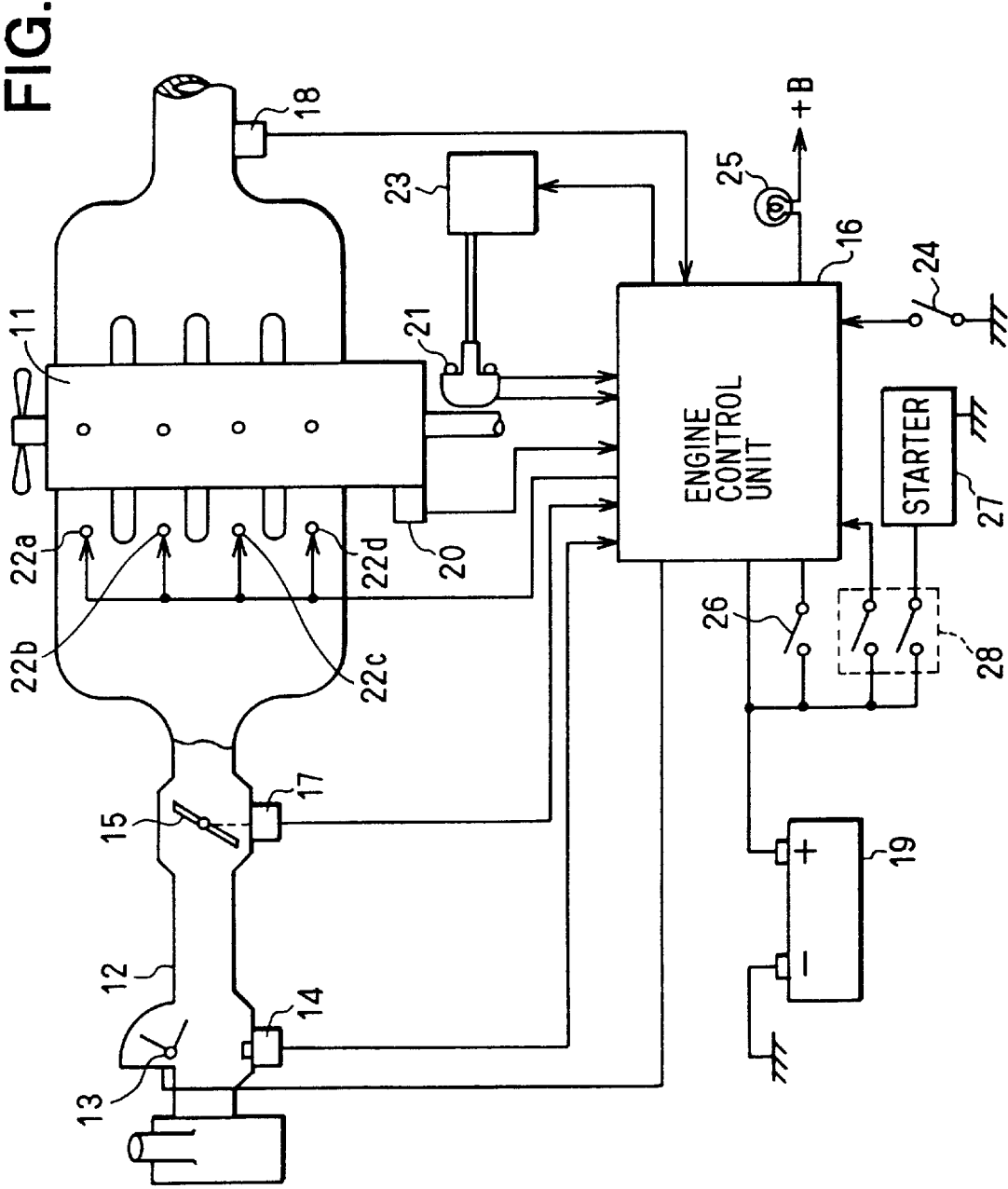
FIG. 1 is a structural diagram showing an engine control system of an embodiment of the present invention.

An embodiment of the present invention will be explained with reference to the accompanying drawings. FIG. 1 is a structural diagram showing an entire part of an engine control system. This engine control system mainly consists of an engine 11 and an engine control unit 16 for controlling the engine 11. The engine control unit 16 may also be referred to herein as a "controller for a vehicle."

Intake air from an air cleaner is supplied to the engine 11 via an intake pipe 12. This intake pipe 12 is allocated with an air flow sensor 13 for measuring an amount of intake air and an intake air temperature sensor 14 for detecting an intake air temperature. Moreover, a throttle valve 15 which is driven by an accelerator pedal is also allocated to the intake pipe 12.

Various signals indicating conditions of engine 11 are inputted into the engine control unit 16. These signals include: an intake air amount detecting signal from the air flow sensor 13, an opening detecting signal for the throttle valve 15 from a throttle sensor 17, a signal from an air-fuel ratio sensor 18 for detecting an oxygen concentration included in exhaust gas, a battery voltage signal from a battery 19, a detection signal from a water temperature sensor 20, a rotating signal from a distributor 21 driven by the engine 11 and a cylinder discrimination signal or the like.

Moreover, the engine control unit 16 calculates, based on these various detection signals, a fuel injection amount or the like, corresponding to a driving condition of the engine 11. It also outputs a fuel injection command to injectors 22a, 22b, 22c, 22d which are respectively set to a plurality of cylinders of the engine 11. It also executes driving control of the engine 11 by outputting an ignition command signal to an igniter 23.

Moreover, the engine control unit 16 executes the diagnosis of each portion of the vehicle based on the detection signals from each sensor group. Therefore, a test switch 24 is allocated to the engine control unit 16 to set a diagnostic mode for outputting a fault detection result. An alarm lamp 25 is also connected so as to display a diagnostic result or the like, as a test result.

The ignition switch 26 is used for connecting the battery 19 to the engine control unit 16, and a starter switch 28 is also provided for controlling a starter motor 27 in conjunction with this ignition switch 26.

Figure 2:
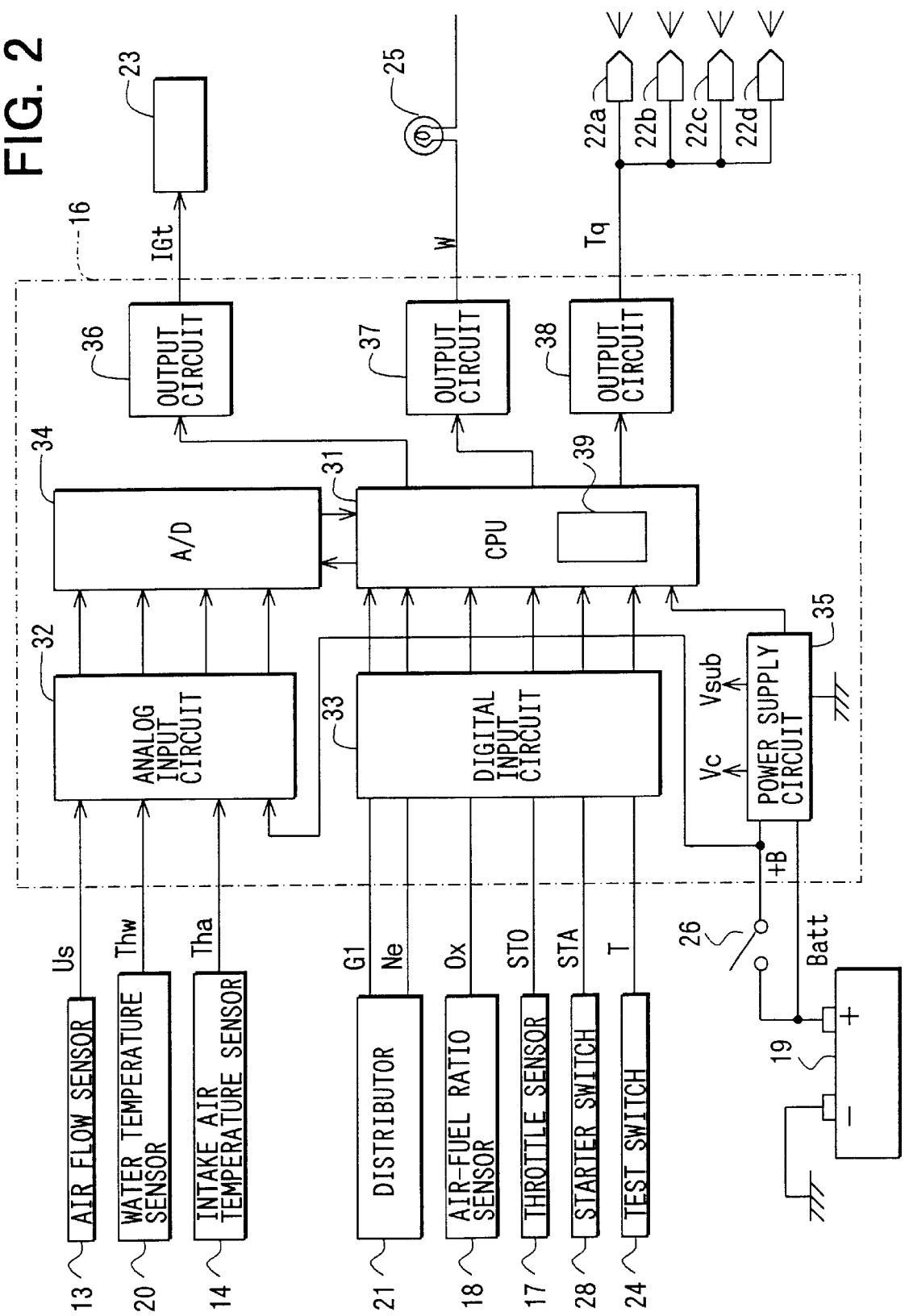
FIG. 2 is a block diagram showing a structure of an engine control unit of an embodiment of the present invention.

Next, the engine control unit 16 will be explained. FIG. 2 is a block diagram showing a structure of the engine control unit 16 shown in FIG. 1. The engine control unit 16 is provided with a CPU 31 to form a computer system. This CPU 31 receives data input from an analog input circuit 32. A digital input circuit 33 and analog input data from the analog input circuit 32 are then input to the CPU 31 after it is converted to digital data by an A/D converter 34.

The following are input into the analog input circuit 32: a detection signal (Us) from the air flow sensor 13, a detection signal (Thw) from the water temperature sensor 20, a detection signal (Tha) from the intake air temperature sensor 14, and a voltage (+B) of the battery 19. Additionally, the following are input into the digital input circuit 33: a cylinder discrimination signal (G1) and a rotation angle signal (Ne) from the distributor 21, a lean/rich signal (Ox) corresponding to oxygen concentration from the air-fuel ratio sensor 18, a signal (STO) indicating the opening of the throttle valve 15 from the throttle sensor 17, a start signal (STA) from the starter switch 28 and a signal (T) for setting the diagnostic mode from the test switch 24.

The A/D converter 34 is provided with a multiplexer function for sequentially reading various, select detection signals input to the analog input circuit 32 depending on the command from CPU 31 and converting the signals to digital data. Moreover, a power supply circuit 35 supplies the voltage +B of the battery to the CPU 31 via the ignition switch 26 and always supplies a backup power supply (Batt).

Output data from the CPU 31 is then supplied to output circuits 36, 37 and 38 and is read as an output signal from the engine control unit 16. Namely, the output circuit 36 outputs an ignition command signal (IGt) to the igniter 23. Moreover, the output circuit 37 outputs a signal (W) indicating a diagnostic result for the lighting control of the alarm lamp 25. An output signal (τq) from the output circuit 38 instructs a fuel injection amount corresponding to a driving condition of the engine 11 and it is output from the injectors 22a to 22d in order to change an injection amount of injectors 22a to 22d.

Moreover, a memory 39 for storing the self-diagnostic program explained later is provided within the CPU (engine control unit) 31. This memory 39 is structured with a ROM and a standby RAM, or a non-volatile EEPROM which is fed with a power supply to hold data even when the ignition switch 26 is turned OFF. The self-diagnostic program is stored in the ROM. As will be explained later, a fault detection result and a fault detection executing record based on a self-diagnostic program are stored in the standby RAM or EEPROM.

This embodiment is characterized in the self-diagnostic program stored in the ROM of the memory 39. Therefore, the self-diagnostic program will be explained.

Figure 3:
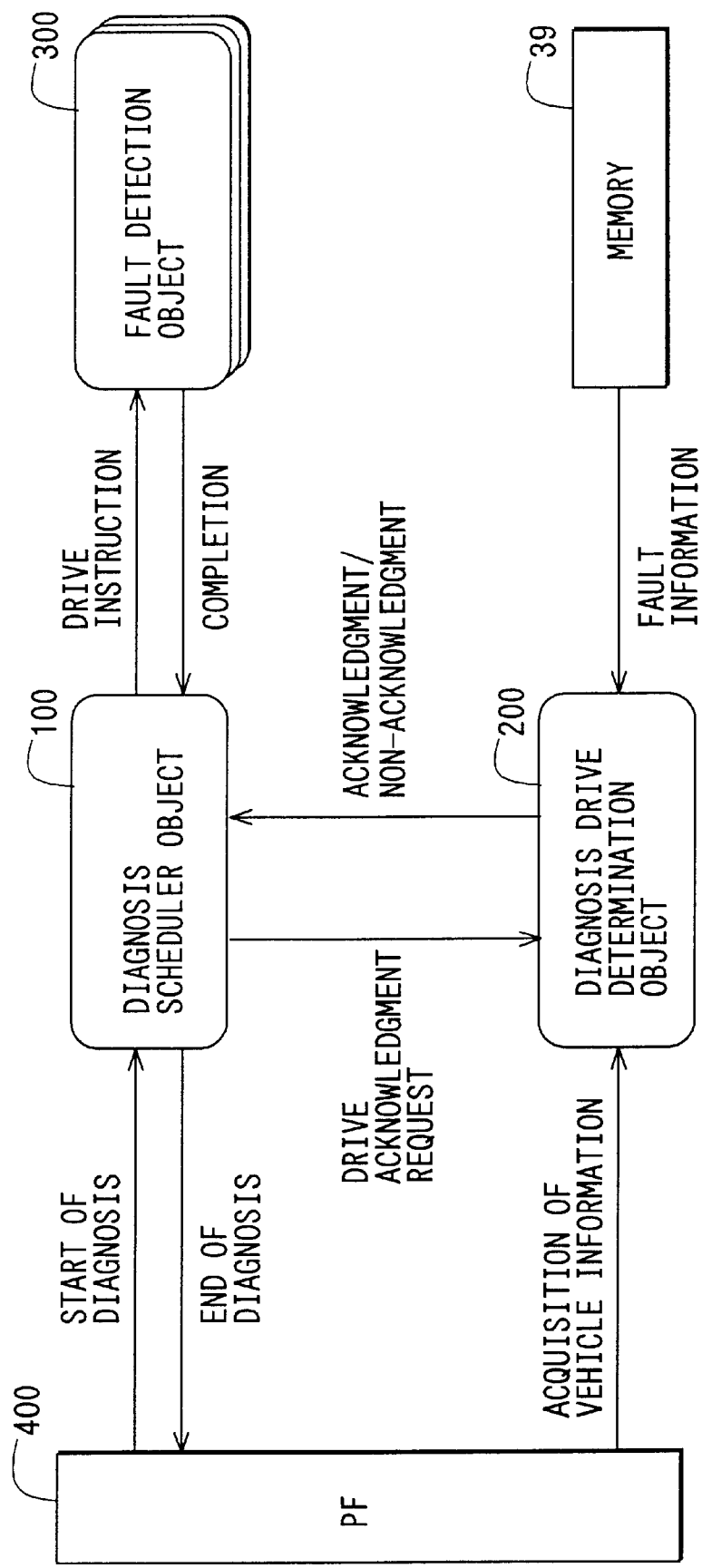
FIG. 3 is an explanatory diagram showing a concept of a format of a self-diagnostic program.

FIG. 3 is an explanatory diagram showing the concept of a structure (architecture) of the self-diagnostic program. The self-diagnostic program is formed of a plurality of programs through an object-oriented design. As is already known, in the object-oriented design, attention is paid to a process (for example, a process of fuel injection) by software. On the other hand, modeling is made in a basic unit of the "thing" and the process is described based on the characteristics and behavior (operation) of the thing. This basic unit is called an "object" and the program described based on this object-oriented design process is described based on this object, defined as a minimum structural unit. The program as a whole, has a series of processes which are executed by coupling the objects with messages from one object to another. One object is provided with data (attribute) and methods (procedures) for this data and executes a method of messages from the other objects. In this embodiment, the expression that the term "object" is the subject of a sentence, for example, "an object executes . . . " is used, but it is of course possible that the process program is executed by the CPU 31.

FIG. 3 shows only the object required for explaining the present embodiment. Namely, the self-diagnostic program in this embodiment is provided with a diagnostic scheduler object 100, a diagnostic drive determination object 200 and a fault detection object 300. In this figure (also in the other figures), an object is expressed as "obj." These objects 100 to 300 are programs located on a PF 400 and operate while conducting information exchange as required with the PF 400.

Upon issuance of a diagnostic start notification as a "timing signal" from the PF 400, the diagnostic scheduler object 100 determines the fault detection object 300 as a drive object. Thereafter, drive acknowledgment for the fault detection object 300 of the drive object is requested to the diagnostic drive determination object 200.

When a drive acknowledgment request is issued from the diagnostic scheduler object 100, the diagnostic drive determination object 200 obtains the information required for determination of the execution condition. In addition, it provides acknowledgment or non-acknowledgment to the diagnostic scheduler object 100 based on this information. As shown in FIG. 3, information about the vehicle is obtained from the PF 400, while information about the fault detection is obtained from the standby RAM or EEPROM of the memory 39.

The diagnostic scheduler object 100 issues, only when an acknowledgment message is received from the diagnostic drive determination object 200, a drive instruction to the fault detection object 300 of the drive object. The fault detection object 300 is prepared for every diaphragm object, such as a water temperature sensor and an intake air temperature sensor. It detects a fault of the diagnostic object based on the drive instruction from the diagnostic scheduler object 100. The fault detection result and fault detection execution record are stored in the memory 39. More particularly, an object (not shown) for storing the fault detection result and execution record is prepared, and a message for this object is output and stored. Here, based on the fault detection result, the alarm lamp 25 illuminates.

Each of the objects 100 to 300 is integrated with various messages explained above and executes a series of processes. Next, coupling of objects 100 to 300 will be explained in more detail with reference to a message sequence chart (hereinafter, referred to as "MSC").

Figure 4:
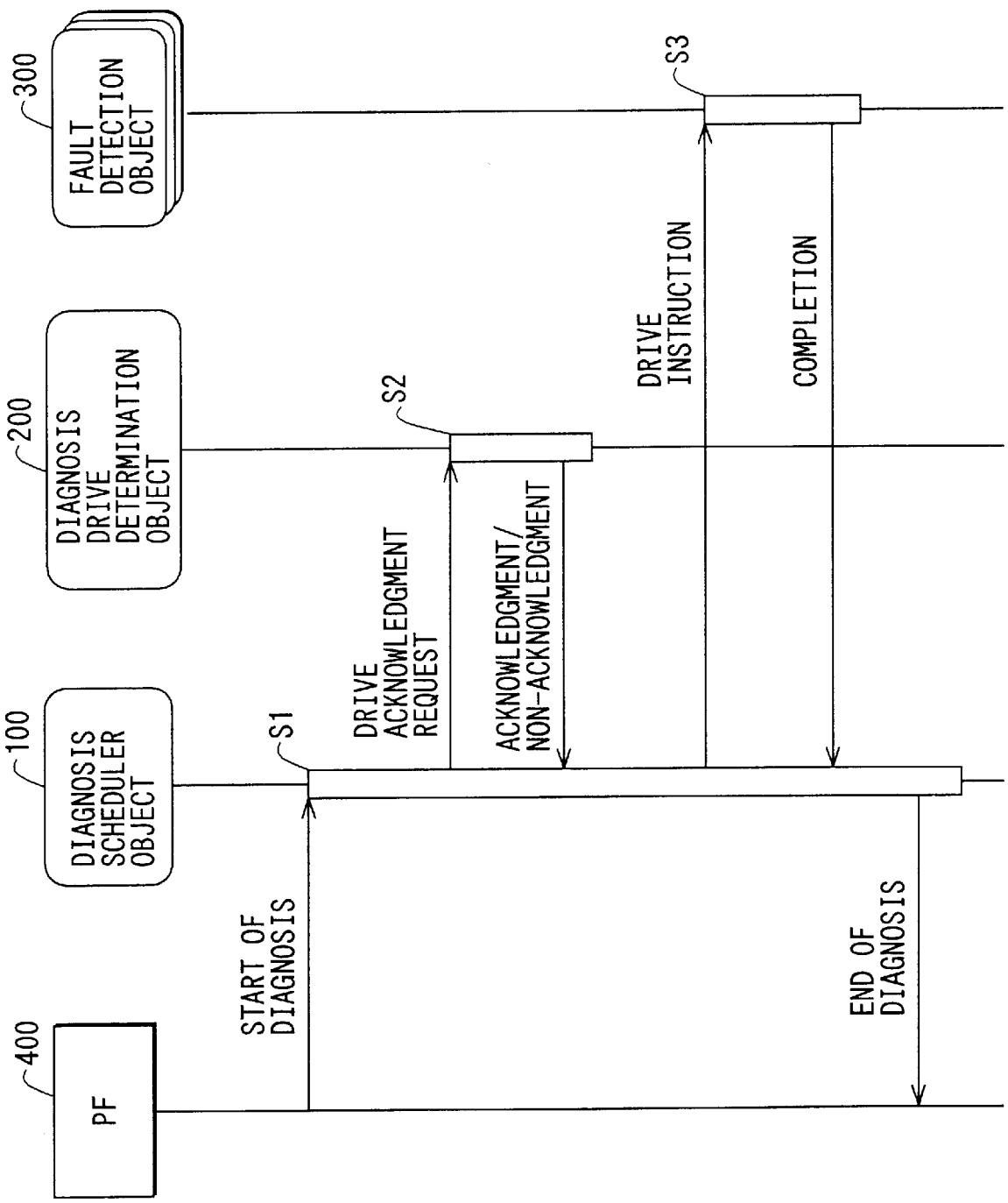
FIG. 4 is an MSC showing diagnosis procedures in the self-diagnostic program.

FIG. 4 is the MSC showing the diagnostic procedures. First, the PF 400 notifies the start of diagnosis to the diagnostic scheduler object 100. Upon reception of the diagnostic start message from the PF 400, the diagnostic scheduler object 100 executes a drive process S1. With this drive process S1, the fault detection object 300 of the drive object is determined. The fault detection object 300 is driven through the diagnostic acknowledgment request to the diagnostic drive determination object 200. When the drive acknowledgment request is notified, the diagnostic drive determination object 200 executes a drive determination process S2. It notifies any acknowledgment/non-acknowledgment to the diagnostic scheduler object 100 based on the obtained information. When the drive instruction is issued based on the acknowledgment message, the fault detection object 300 executes a fault detection process S3. The fault detection result and execution record based on the fault detection process S3 are stored in the memory 39 as explained above.

Upon completion of the fault detection process S3, the fault detection object 300 notifies the end of fault detection to the diagnostic scheduler object 100. When the end message is received from all fault detection objects 300 which have issued the drive instruction, the diagnostic scheduler object 100 completes the diagnostic process by notifying the end of diagnosis to the PF 400.

Next, the drive process S1, drive determination process S2, and fault detection process S3, which are respectively executed in each object 100 to 300, will be explained. In particular, their explanation will deepen the understanding of the operation of objects 100 to 300.

Figure 5:
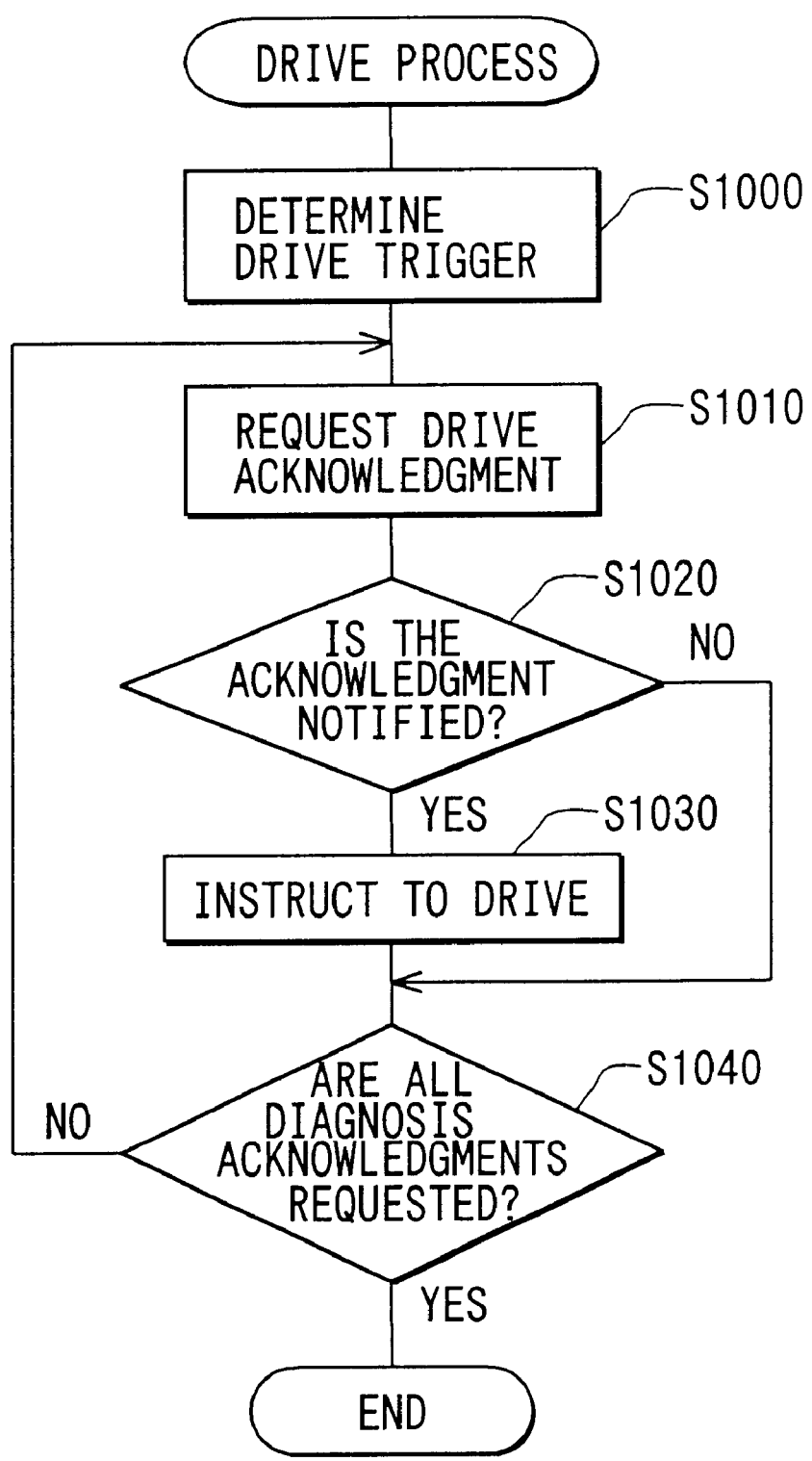
FIG. 5 is a flowchart showing a drive process.

First, the drive process S1 will be explained with reference to FIG. 5 and FIG. 6. FIG. 5 is a flowchart showing the drive process S1 executed with the diagnostic scheduler object 100. This drive process S1 is executed, as explained above, when the diagnostic start message is received from the PF 400.

In the first step (hereinafter a term "step" is indicated with only the letter "S") 1000, the fault detection object 300 of the drive object is determined. This determination is executed based on a drive trigger which is a diagnostic start notification input from the PF 400. Correspondence between the drive trigger and the fault detection object 300 as a drive object is shown in the correspondence table of FIG. 6. From this correspondence table, it can be understood that a plurality of fault detection objects 300 conduct a water temperature sensor diagnosis, an air flow sensor diagnosis, and an intake air temperature sensor diagnosis for the drive trigger which is input every 64 ms and becomes the drive object. Moreover, it is. also understood that the fault detection object 300 to conduct the throttle sensor diagnosis for the drive trigger which is input every 128 ms becomes the drive object. Here, as a drive trigger, a timing signal is input with a predetermined time interval as an example, but it may be a signal input depending on a rotating angle of the engine crank shaft.

In the subsequent step S1010, the drive acknowledgment request notifies the diagnostic drive determination object 200. This drive acknowledgment request is addressed sequentially from the left side objects in the correspondence table of FIG. 6. For example, when a drive trigger of 64 ms is input, the drive acknowledgment of the fault detection object 300 to conduct the water temperature sensor diagnosis, is requested.

For this drive acknowledgment request, the diagnostic drive determination object 200 notifies any one of the acknowledgment/non-acknowledgement messages. Therefore, in the next step S1020, it is determined whether the acknowledgment message is notified or not. Here, when the acknowledgment message is notified (S1020: YES), the drive instruction is issued to the fault detection object 300 in S1030 and thereafter the process shifts to S1040. For example, when the drive of the water temperature sensor diagnosis is acknowledged, the drive instruction is issued to the fault detection object 300 to conduct the water temperature sensor diagnosis. Meanwhile, if the acknowledgment message is not notified (S1020: NO), namely when non-acknowledgment is notified, the process of S1030 is not executed and the process shifts to S1040.

In S1040, it is determined whether the drive acknowledgment of the fault detection object 300, determined as a drive object, is completely requested or not. In an example where the drive trigger is issued every 64 ms, for example, whether all acknowledgment requests have been issued or not in the sequence of: the water temperature sensor diagnosis→the air flow sensor diagnosis→the intake air temperature sensor diagnosis, is determined. When all drive acknowledgments are requested (S1040: YES), the drive process S1 is completed. Meanwhile, if there is a drive acknowledgment not requested (S1040: NO), the process of S1010 is repeated.

Subsequently, the drive determination process S2 will be explained with reference to FIG. 7 and FIG. 8. FIG. 7 shows a flowchart indicating the drive determination process S2 to be executed with the diagnostic drive determination object 200. This drive determination process S2 is executed when the drive acknowledgment request (S1010 in FIG. 5) is issued from the diagnostic scheduler object 100.

In a first step S2000, information required for determination of the execution conditions is acquired. In this step, the fault detection result, fault detection execution record, voltage of an on-board battery 19 +B and time passage after starting the engine are obtained. In the subsequent step S2010, whether the execution conditions are set up or not is determined. This determination is made based on the execution condition determination tables shown in FIGS. 8A and FIG. 8B.

FIG. 8A is a relation table indicating the relationship between diagnostic items as a determination object and the other diagnostic items. For example, when attention is paid to a line in regard to the throttle sensor diagnosis, the water temperature sensor corresponds to the "normal condition." It means that the execution condition of the throttle sensor diagnosis is set up when the diagnosis result of the water temperature sensor is normal. In the same manner, the execution condition of the air flow sensor diagnosis is set up after the throttle sensor diagnosis is executed and the intake air temperature sensor is in a normal condition. According to this relation table, the setup of the execution condition can be determined based on the fault detection result and fault detection execution record obtained in S2000.

Additionally, FIG. 8B shows a condition table indicating a pre-condition for the diagnostic items as a determination object. For example, when attention is paid to the line with regard to the water temperature sensor diagnosis, the time after ignition is set to 0 seconds and the battery voltage is set to 10V (V=volt). It means that the water temperature sensor diagnosis execution condition is set up immediately after starting the engine and when the battery voltage is 10V or higher. In the same manner, the intake air temperature sensor diagnosis execution condition is set up when the battery voltage is 10V or higher after 10 seconds have passed from the starting of the engine. According to this condition table, setup of the execution condition can be determined based on the voltage of battery 19 +B and time passage after starting the engine is obtained in S2000.

FIGS. 8A and 8B show examples of diagnostic items in regard to four sensors as a diagnostic object. However, in actuality, it is enough when similar determination tables are generated for about 200 diagnostic objects. When it is determined that the execution condition is set up in S2010 (S2010: YES), an acknowledgment message is issued in S2020 and thereafter this drive determination process S2 is completed. Meanwhile, when it is determined that the execution condition has not yet been set up (S2010: NO), a non-acknowledgment message is issued in S2030 and thereafter this drive determination process S2 is completed.

Further, the fault detection process S3 will be explained with reference to FIG. 9. Here, an example of the process to execute the fault detection object 300 for water temperature sensor diagnosis will be explained. This fault detection process S3 is executed when the drive instruction is issued from the diagnostic scheduler object 100.

In the first step S3000, a water temperature sensor value is read. Here, the water temperature sensor value is a voltage value of the signal (Thw) detected with the water temperature sensor 20. In the subsequent step S3010, it is determined whether the water temperature sensor value is in the predetermined range or not. For example, in the structure where the water temperature sensor value is obtained in the range of 0.1V to 4.9V, if this value is 0.1V or lower, or 4.9V or higher, it is thought that the water temperature sensor value is fixed due to disconnection of wiring. Here, when this value is determined to be within the predetermined range (S3010: YES), a normal condition is determined in S3020. Thereafter, the end of fault detection is notified and this fault detection process S3 is completed. On the other hand, if this sensor value is determined to be out of the predetermined range (S3010: NO), an abnormal condition is determined in S3030. Thereafter, the end of the fault detection process is notified and thereby this fault detection process S3 is completed.

The effect of the format of each object 100 to 300 as explained above, will then be explained. Here, problems of the existing program format will be repeated again in order to make it easier to understand the explanation. The fault detection logic is described for each diagnosis object. Moreover, it has also been proposed to provide a scheduler in order to determine execution timing of the fault detection logic.

However, not only the timing, but also the relationship with the other fault detection logic must be considered for the execution of part of the fault detection logic. Therefore, the execution condition, in consideration of this relationship, has been determined based on the fault detection logic. In some cases, it has been required to correct not only the corresponding fault detection logic but also the fault detection logic having a relationship with the change in the diagnostic object or the change in execution timing.

Meanwhile, in this embodiment, the diagnostic drive determination object 200 determines the relationship with the other fault detection logic (refer to FIG. 8A), unlike the fault detection object 300. Therefore, even when the diagnostic object is changed and thereby the execution condition is required to be changed, it can be covered by changing the corresponding fault detection object 300 and the diagnostic drive determination object 200. Additionally therefore, it is no longer required to change the fault detection object 300 which is not related directly to the changed diagnostic object. As a result, the self-diagnostic program can be changed easily. In addition, since a human mistake is reduced by summarizing various changes, it can provide much contribution to the improvement of the self-diagnostic program.

Figures 6, 7:
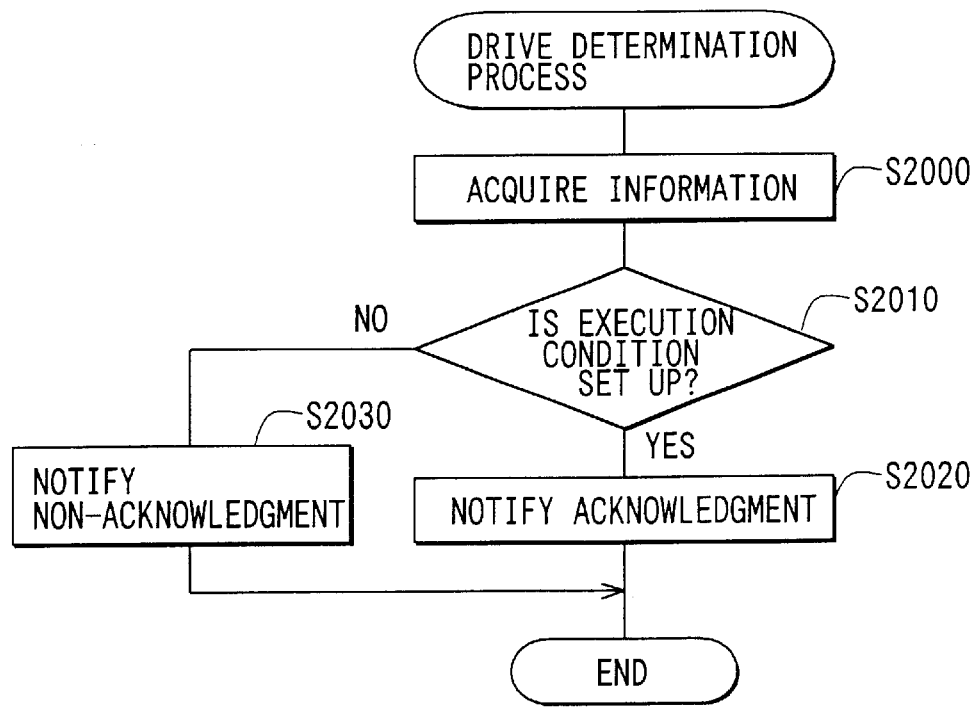
FIG. 6 is a correspondence table for identifying a drive object.
FIG. 7 is a flowchart showing a drive determination process.

Moreover, in this embodiment, the diagnostic drive determination object 200 determines a pre-condition of fault detection (refer to FIG. 8B) in maximum (S2010 in FIG. 7). As a result, the pre-condition of diagnosis execution can also be summarized in the diagnostic drive determination object 200 and therefore it may be changed easily. Moreover, since many pre-conditions can be used in common, this pre-condition will contribute to an improvement of the quality of the self-diagnostic program in such a way that the self-diagnostic program can be designed in a more compact form than the program format for determining the pre-conditions in the individual fault detection logics.

Moreover, in this embodiment, since the diagnostic scheduler object 100 is provided, in addition to the diagnostic drive determination object 200, if the execution timing is changed, this change can be covered with a change of the diagnostic scheduler object 100. This diagnosis scheduler object 100 determines the fault detection object 300 of the drive object based on the correspondence table of FIG. 6. When the relationship between the drive trigger, which is a diagnosis start message, and the fault detection object 300 of the drive object, is indicated in the table, a worker can easily understand the relationship and can change the execution timing more easily. As a result, it improves the quality of the self-diagnostic program.

Here, the diagnostic scheduler object 100 of this embodiment corresponds to the "scheduler object," while the diagnosis drive determination object 200 corresponds to the "drive determination object," and the fault detection object 300 corresponds to the "fault detection object."

The present invention is not limited to the embodiment explained above. It allows various changes in various profiles within the range not departing from the scope of the claims of the present invention. For example, in this embodiment, the fault detection result, fault detection execution record, voltage of battery 19 +B, and time passage after starting the engine, are obtained to determine setup of the execution condition. However, it is enough when the information for determining the setup of the execution condition and necessary information is not limited to those listed above. It can also be thought to determine the setup of the execution condition with the information in the engine control unit 16 that is not related to the diagnostic object and hardware of the vehicle.

Moreover, in this embodiment, the fault detection object 300 is prepared for each diagnostic object, but it is also possible to prepare this object for each fault detection process because the fault detection process may be executed in common for some diagnostic objects. Thereby, the self-diagnostic program can be formed in a compact design.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A controller for a vehicle with a self-diagnostic function for automatically detecting a fault as a diagnosis object, the controller comprising:
    a self-diagnostic program for realizing a self-diagnostic function, the program being object-oriented designed and structured in units of objects that can be reused;
    a fault detection object that is prepared for every unit, in relation to the diagnosis object, to detect a fault as the diagnosis object;
    a scheduler object for determining the fault detection object as a drive object based on an external timing signal wherein a drive of the fault detection object is instructed when the drive is permissible; and
    a drive determination object for determining whether the fault detection object, as a drive object determined with the scheduler object, should be driven or not, and then notifying, based on a determination result, a drive permission to the scheduler object.

2. A controller for a vehicle with a self-diagnostic function according to claim 1, wherein the drive determination object determines whether the fault detection object as the drive object should be driven or not, in consideration of a relationship of the fault detection among the fault detection objects.

3. A controller for a vehicle according to claim 2, wherein determination in consideration of a relationship of the fault detection should be made based on at least one factor of the fault detection result of another fault detection object in relation to the fault detection objet as a drive object and a fault detection execution record.

4. A controller for a vehicle with a self-diagnostic function according to claim 3, wherein the drive determination object determines whether the fault detection object as the drive object should be driven or not in consideration of a common pre-condition of the fault detection among the fault detection objects.

5. A controller for a vehicle according to claim 4, wherein the determination in consideration of the pre-condition of fault detection should be made based on at least one factor of voltage of an on-board battery and time passage after starting a vehicle engine.

6. A controller for a vehicle with a self-diagnostic function according to claim 5, wherein the scheduler object has a correspondence table describing the fault detection object as the drive object corresponding to the external timing signal and determines the fault detection object as the drive object by referring to the correspondence table.

7. A controller for a vehicle with a self-diagnostic function according to claim 4, wherein the scheduler object has a correspondence table describing the fault detection object as the drive object corresponding to the external timing signal and determines the fault detection object as the drive object by referring to the correspondence table.

8. A controller for a vehicle with a self-diagnostic function according to claim 3, wherein the scheduler object has a correspondence table describing the fault detection object as the drive object corresponding to the external timing signal and determines the fault detection object as the drive object by referring to the correspondence table.

9. A controller for a vehicle with a self-diagnostic function according to claim 2, wherein the drive determination object determines whether the fault detection object as the drive object should be driven or not in consideration of a common pre-condition of the fault detection among the fault detection objects.

10. A controller for a vehicle according to claim 9, wherein the determination in consideration of the pre-condition of fault detection should be made based on at least one factor of voltage of an on-board battery and time passage after starting a vehicle engine.

11. A controller for a vehicle with a self-diagnostic function according to claim 10, wherein the scheduler object has a correspondence table describing the fault detection object as the drive object corresponding to the external timing signal and determines the fault detection object as the drive object by referring to the correspondence table.

12. A controller for a vehicle with a self-diagnostic function according to claim 9, wherein the scheduler object has a correspondence table describing the fault detection object as the drive object corresponding to the external timing signal and determines the fault detection object as the drive object by referring to the correspondence table.

13. A controller for a vehicle with a self-diagnostic function according to claim 2, wherein the scheduler object has a correspondence table describing the fault detection object as the drive object corresponding to the external timing signal and determines the fault detection object as the drive object by referring to the correspondence table.

14. A controller for a vehicle with a self-diagnostic function according to claim 1, wherein the drive determination object determines whether the fault detection object as the drive object should be driven or not in consideration of a common pre-condition of the fault detection among the fault detection objects.

15. A controller for a vehicle according to claim 14, wherein the determination in consideration of the pre-condition of fault detection should be made based on at least one factor of voltage of an on-board battery and time passage after starting a vehicle engine.

16. A controller for a vehicle with a self-diagnostic function according to claim 15, wherein the scheduler object has a correspondence table describing the fault detection object as the drive object corresponding to the external timing signal and determines the fault detection object as the drive object by referring to the correspondence table.

17. A controller for a vehicle with a self-diagnostic function according to claim 14, wherein the scheduler object has a correspondence table describing the fault detection object as the drive object corresponding to the external timing signal and determines the fault detection object as the drive object by referring to the correspondence table.

18. A controller for a vehicle with a self-diagnostic function according to claim 1, wherein the scheduler object has a correspondence table describing the fault detection object as the drive object corresponding to the external timing signal and determines the fault detection object as the drive object by referring to the correspondence table.

19. A vehicle controller apparatus having a self-diagnostic function in a self-diagnosis program for automatically detecting fault of a diagnosis object, the controller comprising:
   a determination logic of execution conditions for detecting a failure of a diagnosed object; and
   a fault detection logic based on an external timing signal for checking execution conditions used to perform the corresponding determination logic, wherein the determination logic and the fault detection logic are separately executed.

20. A vehicle controller apparatus having a self-diagnostic function for automatically detecting a fault as a diagnosis object, the controller comprising:
   a self-diagnostic program to realize a self-diagnostic function, wherein the self-diagnosing program is object-oriented designed and structured in units of objects that can be reused;
   a fault detection object that is prepared for a unit in relation to the diagnosis object, to detect a fault as the diagnosis object;
   a scheduler object for determining the fault detection object as a drive object based on an external timing signal, wherein a drive of the fault detection object is instructed when the drive is permissible; and
   a drive determination object that determines whether the fault detection object, as a drive object determined with the scheduler object, should be driven or not, wherein a drive permission is instructed to the scheduler object, based on a determination result of the drive determination object.

21. A vehicle controller apparatus having a self-diagnostic function of a self-diagnostic program for automatically detecting a fault as a diagnosis object, the controller comprising:
   a fault detection object;
   a diagnosis scheduler object that executes a drive program so that the fault detection object can be determined;
   a diagnostic drive determination object for receiving the fault detection object, wherein before the fault detection object detects a fault as a diagnosis object, the diagnosis drive determination object issues an acknowledgment if it is satisfied with the drive acknowledgment request or a non-acknowledgment if the diagnosis drive determination object is unsatisfied with the drive acknowledgment request; and
   a memory portion for storing a fault detection result of the self-diagnostic program.

22. A method of controlling a vehicle having a self-diagnostic function of a self-diagnostic program for automatically detecting a fault as a diagnosis object, the method comprising:
   utilizing a diagnosis scheduler object to determine a fault detection object and to send a drive acknowledgment request to a diagnosis drive determination object;
   obtaining information utilizing the diagnosis drive determination object and providing a drive acknowledgment or a non-acknowledgment message from the diagnosis drive determination object to the diagnosis scheduler object based on the obtained information;
   providing a drive instruction from the diagnosis scheduler object to the fault detection object when an acknowledgment message is provided from the diagnostic drive determination object to the diagnosis scheduler object.

23. A method of operating a diagnosis scheduler object of a vehicle controller apparatus having a self-diagnostic function of a self-diagnostic program for automatically detecting a fault as a diagnosis object, the method comprising:
   executing a drive process so that a fault detection object can be determined;
   issuing and transmitting a drive acknowledgment request to a diagnosis drive determination object;
   receiving a drive acknowledgment or a drive non-acknowledgment from the diagnosis drive determination object depending on whether the diagnosis drive determination object is satisfied or unsatisfied with the drive acknowledgment request;
   receiving the drive acknowledgment or the drive non-acknowledgment from the diagnosis drive determination object; and
   providing a drive instruction to the fault detection object only when a drive acknowledgment is received from the diagnosis drive determination object.

24. A method of controlling a vehicle having a self-diagnostic function of self-diagnostic program for automatically detecting a fault as a diagnosis object, the method comprising:
   utilizing a scheduler object to determine a fault detection object as a drive object;
   determining whether the fault detection object, as a drive object determined by the scheduler object, should be driven or not utilizing a drive determination object;
   enabling the drive determination object to provide a drive permission message or a drive non-permission message to the scheduler object; and
   enabling the scheduler object to determine whether to send a drive instruction to the fault detection object based on whether a drive permission message or a drive non-permission message was received from the drive determination object.

25. The method of claim 24, wherein the scheduler object transmits a drive instruction to the fault detection object if a drive permission message is received from the drive determination object.

* * * * *